US012370560B1

(12) United States Patent
Wang

(10) Patent No.: US 12,370,560 B1
(45) Date of Patent: Jul. 29, 2025

(54) SHOWERHEAD WITH MASSAGE FUNCTION

(71) Applicant: Libin Wang, Neijiang (CN)

(72) Inventor: Libin Wang, Neijiang (CN)

( * ) Notice: Subject to any disclaimer, the term of this patent is extended or adjusted under 35 U.S.C. 154(b) by 0 days.

(21) Appl. No.: 19/080,432

(22) Filed: Mar. 14, 2025

(30) Foreign Application Priority Data

Dec. 11, 2024 (CN) ......................... 202423065145.8

(51) Int. Cl.
*B05B 3/04* (2006.01)
*B05B 1/16* (2006.01)
*B05B 1/18* (2006.01)

(52) U.S. Cl.
CPC .............. *B05B 1/1636* (2013.01); *B05B 1/18* (2013.01); *B05B 3/0409* (2013.01)

(58) Field of Classification Search
CPC ......... B05B 1/1636; B05B 1/18; B05B 1/185; B05B 3/025; B05B 3/04; B05B 3/0409; B05B 3/0418; B05B 3/0422; B05B 3/14; B05B 3/16
See application file for complete search history.

(56) References Cited

U.S. PATENT DOCUMENTS

| | | | | |
|---|---|---|---|---|
| 6,360,967 B1 * | 3/2002 | Schorn | B05B 3/0463 239/240 |
| 9,815,070 B2 * | 11/2017 | Lin | B05B 1/1636 |
| 2014/0008462 A1 * | 1/2014 | Gransow | B05B 1/14 239/391 |
| 2016/0228887 A1 * | 8/2016 | Lin | B05B 3/0463 |
| 2016/0296950 A1 * | 10/2016 | Tian | B05B 3/0422 |
| 2017/0348708 A1 * | 12/2017 | Lin | B05B 1/185 |
| 2023/0009593 A1 * | 1/2023 | Chen | B05B 1/185 |
| 2023/0173512 A1 * | 6/2023 | Wang | B05B 3/16 239/242 |
| 2024/0286152 A1 * | 8/2024 | Hofman | B05B 3/0422 |

FOREIGN PATENT DOCUMENTS

| | | | |
|---|---|---|---|
| CN | 106925449 A * | 7/2017 | |
| CN | 116116593 A * | 5/2023 | |
| CN | 116273523 A * | 6/2023 | |
| CN | 116371621 A * | 7/2023 | |
| CN | 117046631 A * | 11/2023 | B05B 1/185 |
| CN | 117046633 A * | 11/2023 | B05B 3/16 |
| CN | 118654166 A * | 9/2024 | B05B 1/18 |
| CN | 119056602 A * | 12/2024 | B05B 1/18 |

* cited by examiner

*Primary Examiner* — Darren W Gorman
(74) *Attorney, Agent, or Firm* — Birchwood IP

(57) ABSTRACT

A showerhead with massage function is provided, which includes a showerhead water outlet tray and a water inlet seat. The showerhead water outlet tray is provided with a water outlet chamber, a bottom surface of the water outlet chamber is provided with a plurality of water outlet holes. The water inlet seat is provided on a top surface of the showerhead water outlet tray and communicated with the water outlet chamber. A top of the water inlet seat is provided with a water inlet joint connected to an external water source, and a water outlet nozzle is penetrated through the water outlet holes. A middle of the water outlet nozzle is provided with a joint that cooperates with inner walls of the water outlet holes to render the water outlet nozzle to swing in the water outlet hole and swing around the joint as a center.

9 Claims, 13 Drawing Sheets

SHOWERHEAD WITH MASSAGE FUNCTION

CROSS-REFERENCE TO RELATED APPLICATIONS

This application claims priority to Chinese Patent Application No. 202423065145.8, filed on Dec. 11, 2024, which is hereby incorporated by reference in its entirety.

TECHNICAL FIELD

The present disclosure relates to the field of showerhead technologies, and in particular, to a showerhead with massage function.

BACKGROUND

A showerhead is a commonly used water outlet component for showering nowadays, and there are also various types of showerheads, such as top spray showerheads, side spray showerheads, etc. At present, the above-mentioned showerhead only has a simple direct water outlet function to achieve different shower effects with the layout position. However, further improvements can be made to the showerhead to achieve more shower effects and meet the needs of more people.

SUMMARY

In order to overcome the shortcomings of existing technology, the present disclosure provides a showerhead with massage function.

The technical solution adopted by the present disclosure to solve its technical problem is as follows.

A showerhead with massage function, including a showerhead water outlet tray and a water inlet seat, where a water outlet chamber is provided in the showerhead water outlet tray, and a plurality of water outlet holes communicated with the water outlet chamber are provided on a bottom surface of the water outlet chamber; the water inlet seat is provided on a top surface of the showerhead water outlet tray and communicated with the water outlet chamber; a top of the water inlet seat is provided with a water inlet joint that is connected to an external water source; where a water outlet nozzle is penetrated through the water outlet holes, and a joint is provided in a middle of the water outlet nozzle; the joint is cooperated with inner walls of the water outlet holes to render the water outlet nozzle to swing around the joint as a center and swing in the water outlet holes; the water outlet chamber is provided with a sliding plate that is capable of moving horizontally; a plurality of insertion holes configured for a top of the water outlet nozzle to be inserted is provided on the sliding plate, when the sliding plate is moved horizontally, the water outlet nozzle is driven to swing synchronously; a hydrodynamic device is provided in the water inlet seat, and the hydrodynamic device is driven by the water source entering through the water inlet joint; the hydrodynamic device includes a transmission mechanism driven by the water source and a cam driven by the transmission mechanism; a middle of the sliding plate is provided with a driven groove that cooperates with the cam; an outer contour surface of the cam abuts against a side wall of the driven groove; by rotating the cam, the outer contour of the cam sequentially pushes two opposite side walls of the driven groove to achieve a translational movement of the sliding plate.

In some embodiments of the present disclosure, the water outlet chamber is further provided with a track bracket, and the track bracket is provided with a plurality of hollow holes that avoid the water outlet nozzle, a plurality of track plates are provided in a same horizontal direction on the two opposite sides of the track bracket; two sides of the sliding plate are provided with track grooves configured for the track plates to be inserted, and the sliding plate slides along the track plates through the track grooves to achieve the translational movement in the water outlet chamber.

In some embodiments of the present disclosure, the transmission mechanism includes a water inlet plate, an impeller, and a gear mechanism, where the water inlet plate, the impeller, and the gear mechanism are arranged sequentially along a direction of water entering; where the water inlet plate is provided with a plurality of inlet ports that are diagonally penetrated and arranged in a circumferential direction; when the water source entering the water inlet joint flows through the inlet ports, the water source forms a water column that sprays diagonally and impacts blades of the impeller, thereby driving the impeller to rotate; a bottom of the impeller is provided with a driving gear that cooperates with the gear mechanism; the gear mechanism is provided with a power output end and a power input end that meshes with the driving gear; and the cam is provided on the power output end.

In some embodiments of the present disclosure, the gear mechanism includes a sleeve with a toothed inner wall, and a first planetary gear set and a second planetary gear set provided in the sleeve and meshing with an inner wall of the sleeve, the first planetary gear set includes a first gear carrier and a first gear set, the second planetary gear set includes a second gear carrier and a second gear set, the first gear set forms a power input end meshing with the driving gear; a bottom of the first gear carrier is provided with a transmission gear that meshes with the second gear set, and the power output end is provided at a bottom of the second gear carrier.

In some embodiments of the present disclosure, a central rotating shaft extends downward from a middle of the water inlet plate, the impeller, the first gear carrier, and the second gear carrier are rotatably provided on the central rotating shaft.

In some embodiments of the present disclosure, a sealing gasket is provided on a bottom wall of the water outlet chamber, and the sealing gasket is provided with a plurality of sealing sleeves corresponding to the water outlet nozzle; the water outlet nozzle is provided in the sealing sleeves in a sealing manner.

In some embodiments of the present disclosure, the sealing sleeves is provided with a folding part, and the folding part is provided with a sleeve opening configured for a top of the water outlet nozzle to pass through.

In some embodiments of the present disclosure, a spherical protrusion is formed in a middle of the water outlet nozzle to form the joint, and a bowl-shaped groove is formed on inner walls of the water outlet holes to match with the spherical protrusion.

In some embodiments of the present disclosure, the showerhead water outlet tray and the water inlet seat are provided in a pre-embedded shell, the pre-embedded shell includes a face cover, a bottom shell, a decorative frame, and a-pre embedded box; the face cover, the bottom shell, and the decorative frame form an accommodation cavity configured to accommodate the showerhead water outlet tray and the water inlet seat, the pre-embedded box is sleeved outside the bottom shell and embedded in a wall, and the water inlet joint passes through the bottom shell and the pre-embedded box and is communicated with a water pipe in the wall.

In some embodiments of the present disclosure, the showerhead water outlet tray is accommodated in a decorative box, a decorative plate is provided on the water inlet seat, and the water inlet joint is located behind the decorative plate.

The beneficial effects of the present disclosure are: the hydrodynamic device is arranged in the water inlet seat of the showerhead, and the water source entering from the water inlet seat drives the hydrodynamic device to drive the sliding plate in the showerhead water outlet tray to move horizontally. The water outlet holes of the showerhead water outlet tray are connected with the water outlet nozzle that can swing and adjust the water outlet direction, and top of the water outlet nozzle is connected to the sliding plate. A translational movement of the sliding plate drives the water outlet nozzle to swing synchronously, so that the water outlet of the showerhead is in a constantly swinging water outlet state. The constantly swinging water outlet can continuously impact a plurality of parts of the human body and move back and forth, thereby playing a massage effect.

BRIEF DESCRIPTION OF DRAWINGS

The following will further explain the present disclosure in combination with the accompanying drawings and embodiments.

DESCRIPTION OF EMBODIMENTS

Figure 1:
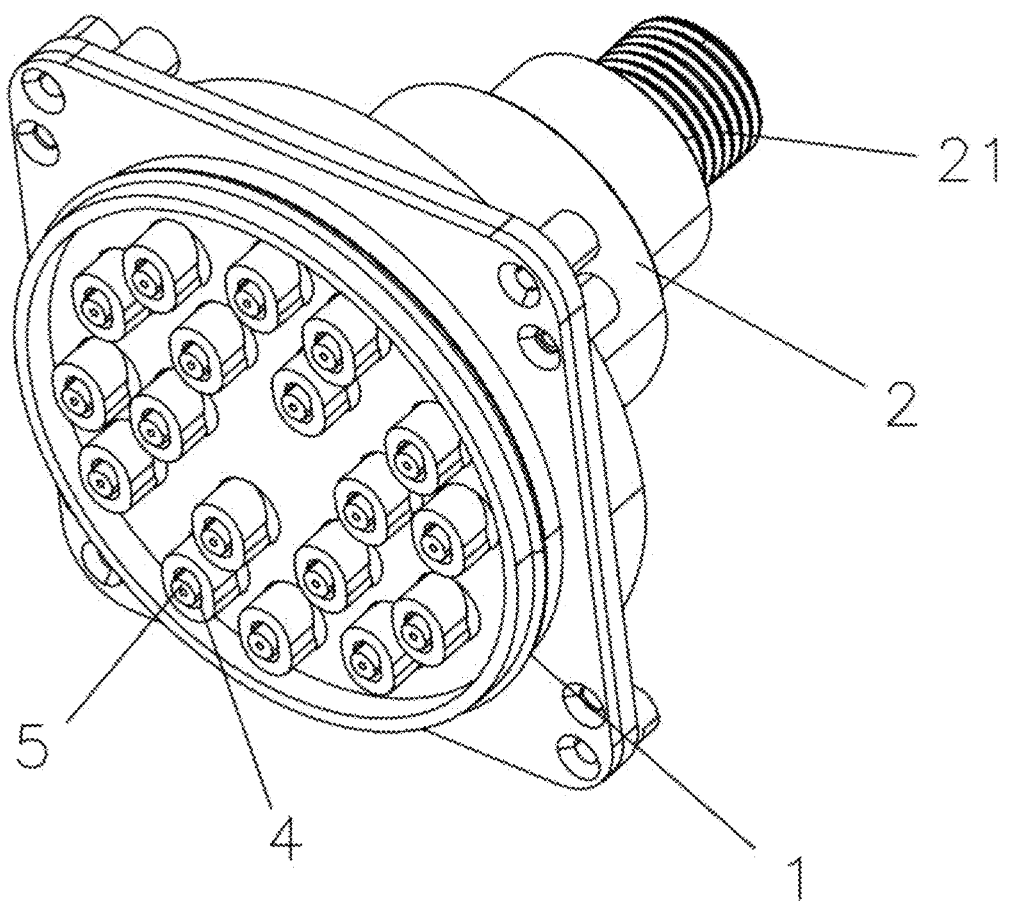
FIG. 1 is a schematic structural diagram of the present disclosure.
Figure 2:
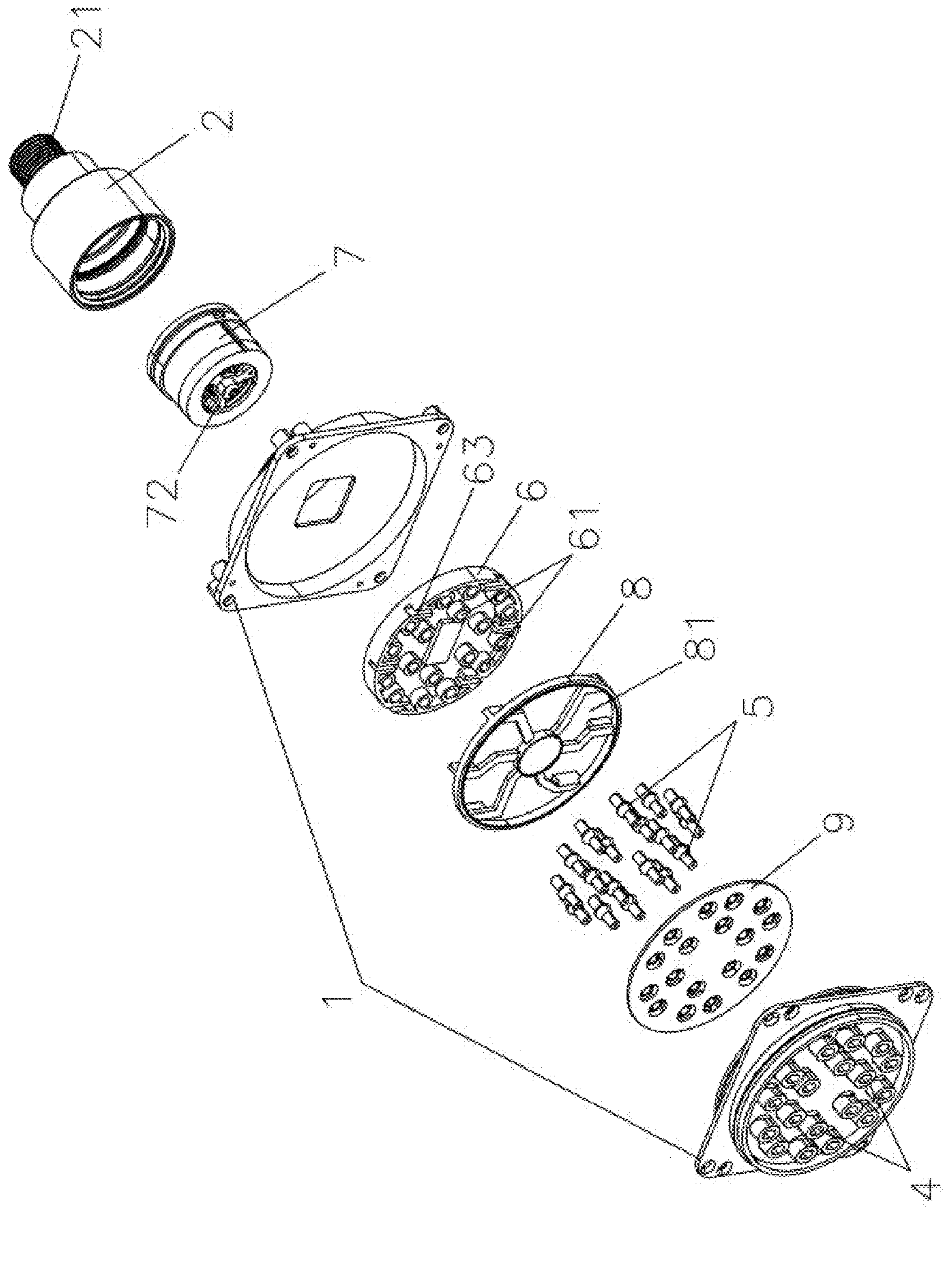
FIG. 2 is a schematic diagram of a disassembly of the present disclosure.
Figure 3:
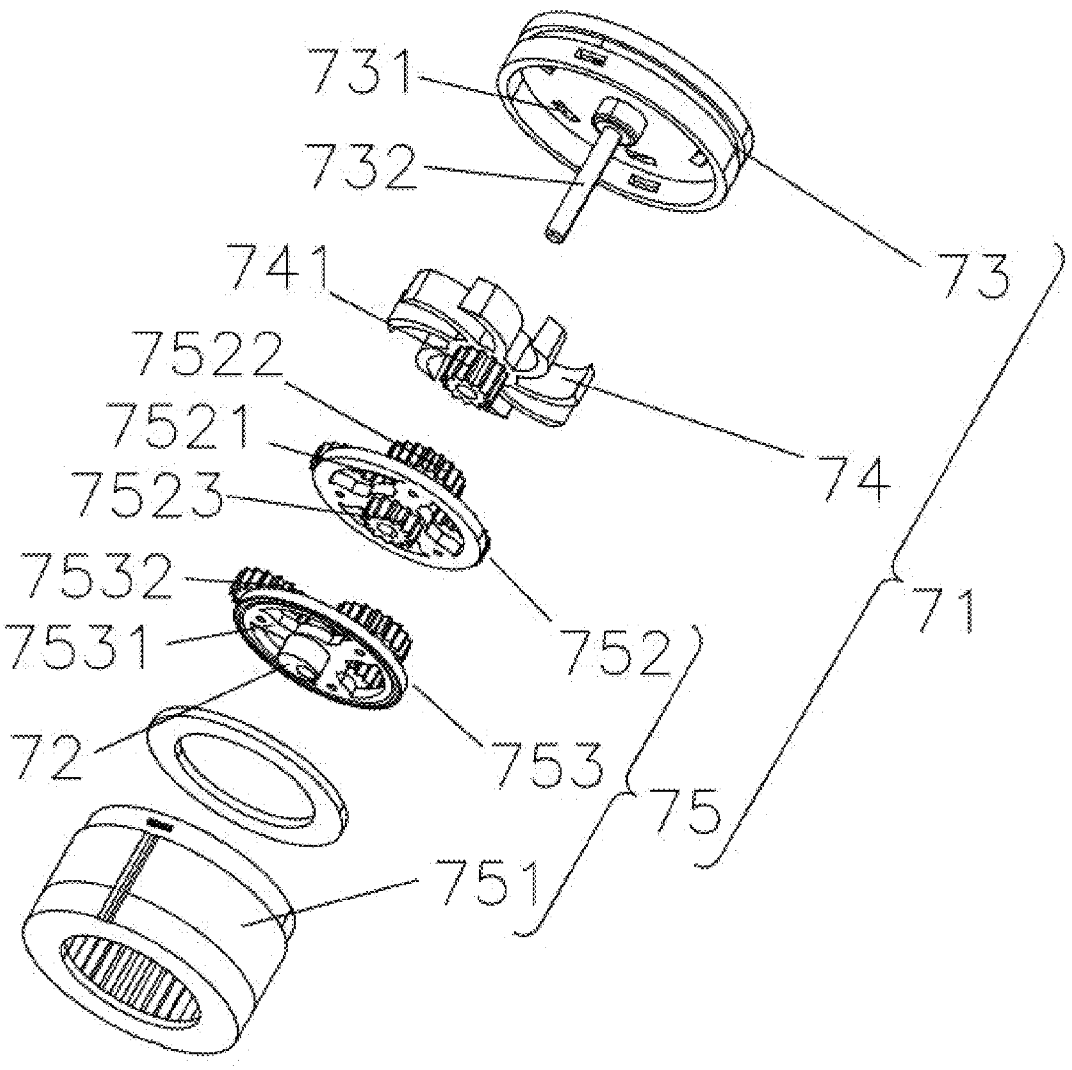
FIG. 3 is a schematic diagram of a disassembly of a transmission mechanism of the present disclosure.
Figure 4:
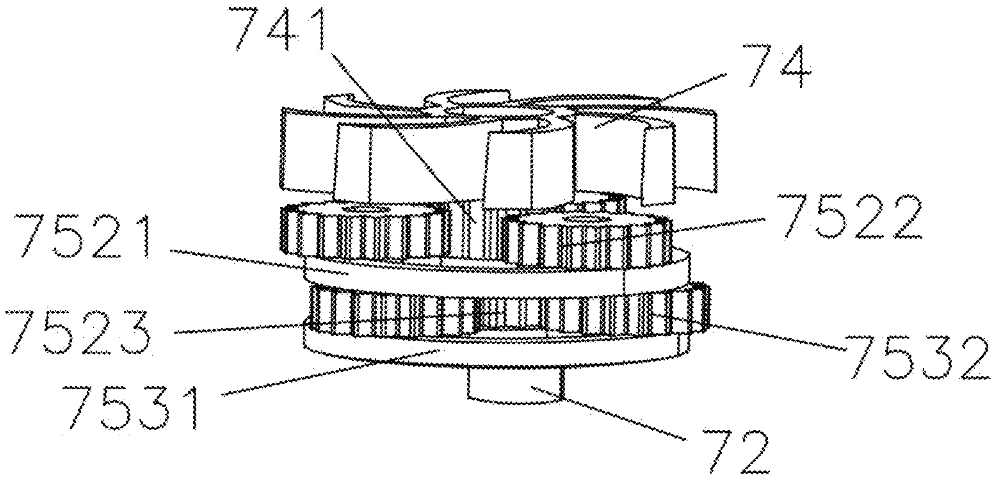
FIG. 4 is a combined state diagram of an impeller, a first planetary gear set, and a second planetary gear set of the present disclosure.
Figure 5:
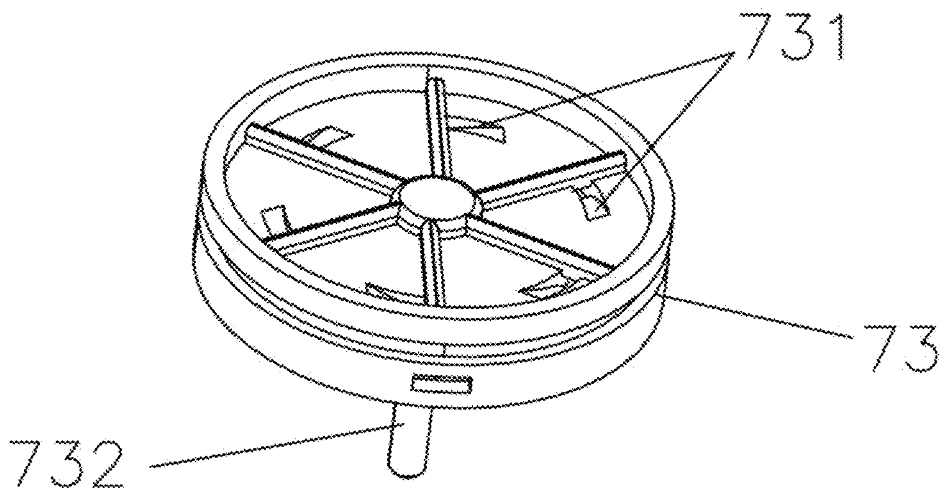
FIG. 5 is a schematic structural diagram of a water inlet plate of the present disclosure.
Figure 6:
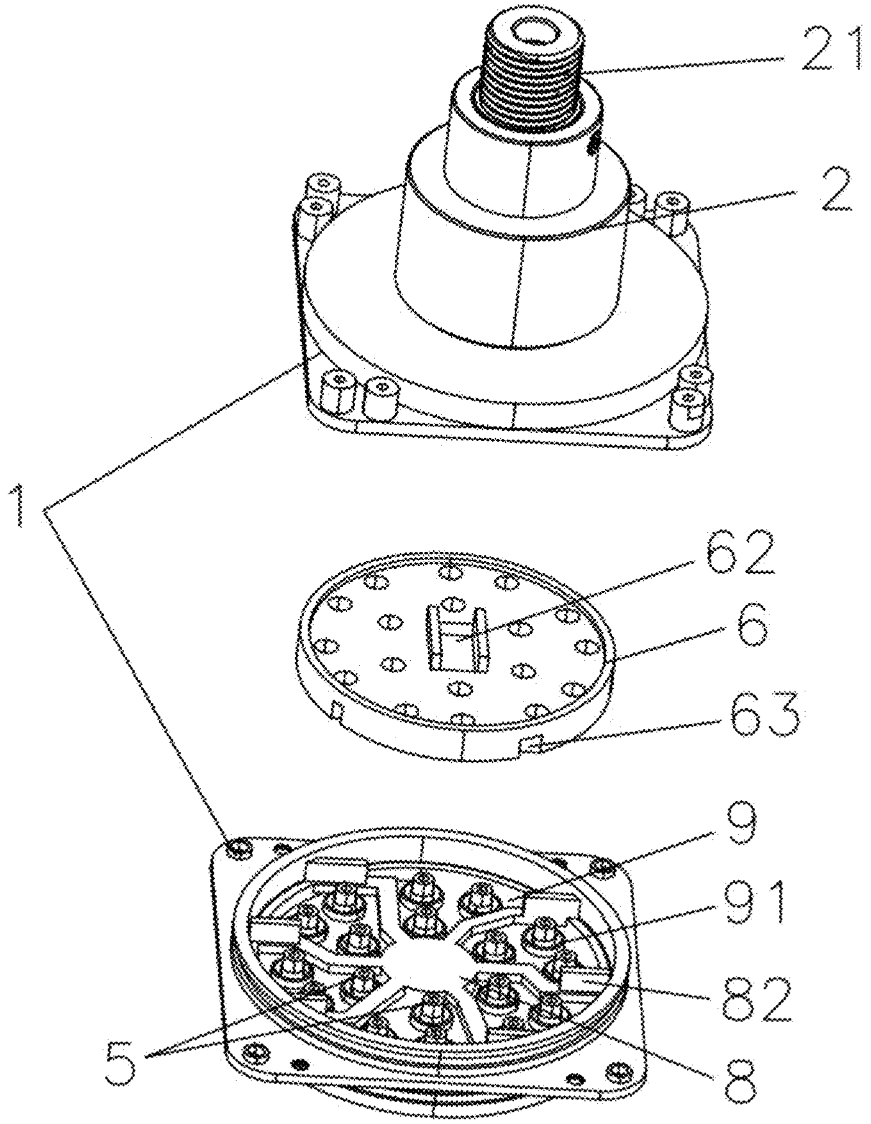
FIG. 6 is a schematic diagram of an internal structure of a showerhead water outlet tray of the present disclosure.
Figure 7:
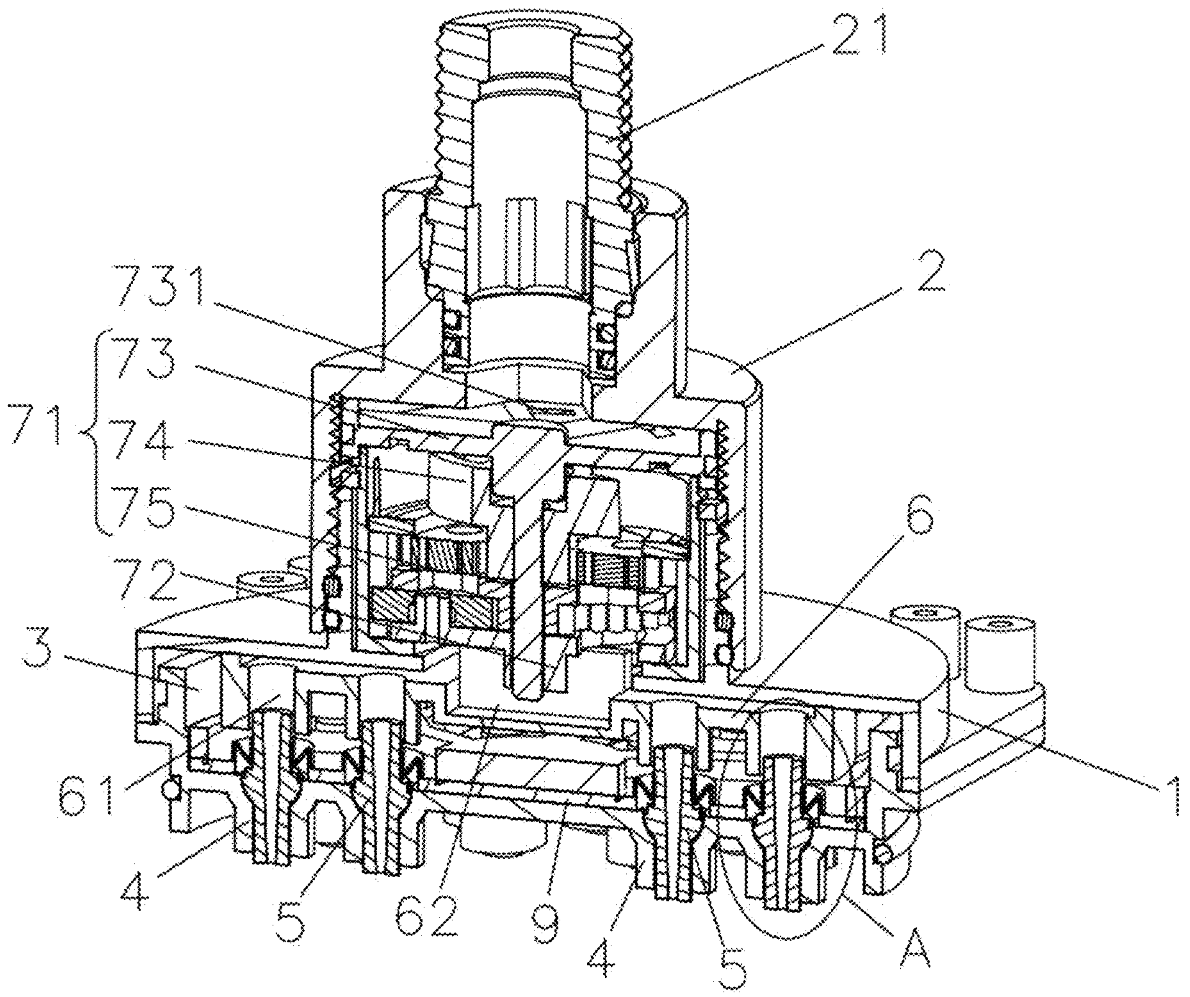
FIG. 7 is a sectional view of the present disclosure.
Figure 8:
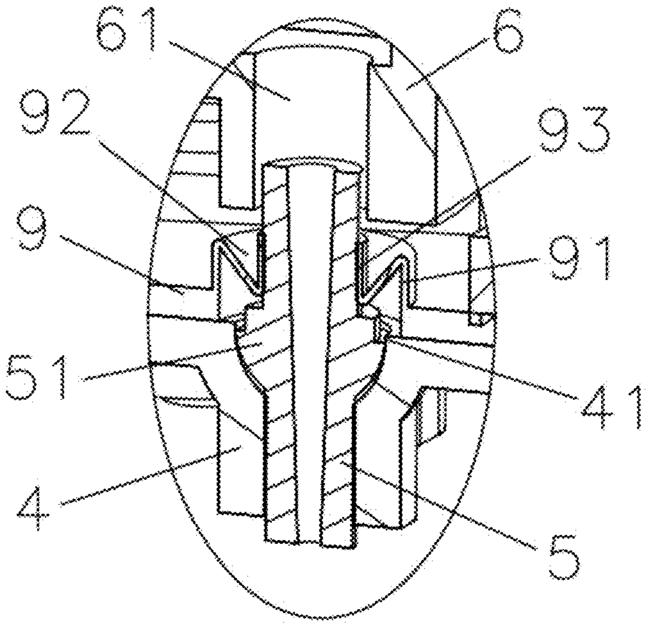
FIG. 8 is an enlarged view of point A in FIG. 7.
Figure 9:
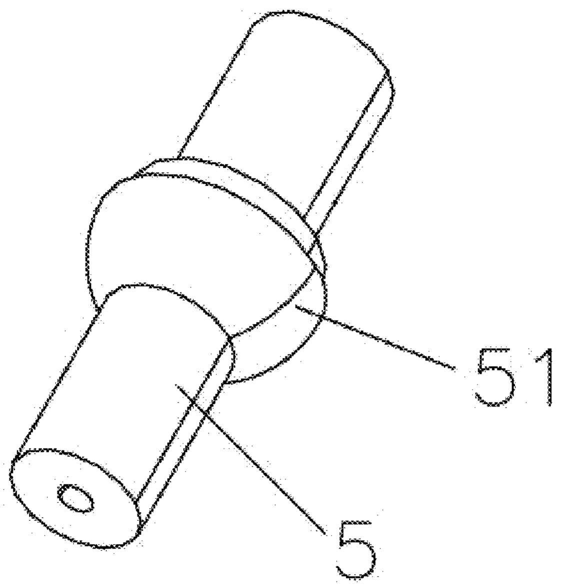
FIG. 9 is a schematic structural diagram of a water outlet nozzle of the present disclosure.

A showerhead with massage function as shown in FIGS. 1 to 9, including a showerhead water outlet tray 1 and a water inlet seat 2. A water outlet chamber 3 is provided in the showerhead water outlet tray 1, and a plurality of water outlet holes 4 communicated with the water outlet chamber 3 are provided on a bottom surface of the water outlet chamber 3. The water inlet seat 2 is provided on a top surface of the showerhead water outlet tray 1 and communicates with the water outlet chamber 3. A top of the water inlet seat 2 is provided with a water inlet joint 21 that connects to an external water source. Water entering from the water inlet joint 21 enters the showerhead water outlet tray 1 through an interior of the water inlet seat 2 and fills the entire water outlet chamber 3. Finally, showerhead water that forms a spray is discharged from the plurality of water outlet holes 4.

There is a water outlet nozzle 5 connected to the water outlet holes 4, and the water outlet nozzle 5 is communicated with the water outlet chamber 3. The water outlet of the water outlet holes 4 is realized by the water outlet nozzle 5. A joint 51 is provided in a middle of the water outlet nozzle 5, the joint 51 cooperates with inner walls of the water outlet holes 4 to render the water outlet nozzle 5 to swing around the joint 51 as a center and swing in the water outlet holes 4. The water outlet chamber 3 is provided with a sliding plate 6 that can move horizontally, and the sliding plate 6 is provided with a plurality of insertion holes 61 configured for a top of the water outlet nozzle 5 to pass through. When the sliding plate 6 moves horizontally, and the water outlet nozzle 5 is driven to swing synchronously.

A swing of the sliding plate 6 is driven by a hydrodynamic device 7 in the water inlet seat 2, the hydrodynamic device 7 is driven by the water source entering through the water inlet joint 21. A driving of the sliding plate 6 does not require additional electrical driving components such as a motor, rendering it more stable in humid environments. The overall structure is compact and does not occupy additional volume, which is compliance with the requirement of simple structure and less space occupation when the showerhead is provided in a bathroom. The hydrodynamic device 7 includes a transmission mechanism 71 driven by the water source and a cam 72 driven by the transmission mechanism 71. A middle of the sliding plate 6 is provided with a driven groove 62 that cooperates with the cam 72. An outer contour surface of the cam 72 abuts against a side wall of the driven groove 62. By rotating the cam 72, a highest point of the convex outer contour of the cam 72 sequentially pushes two opposite side walls of the driven groove 62 so as to achieve a reciprocating translation of the sliding plate 6, thereby continuously driving the plurality of water outlet nozzle 5 to swing synchronously, so that the water output of the showerhead is in a continuous swinging water output state. The continuously swinging water output can continuously impact a plurality of parts of the human body and constantly move back and forth, thereby playing a massage effect.

In an implementation mode of the present disclosure, the water outlet chamber 3 is further provided with a track bracket 8, and the track bracket 8 is provided with a plurality of hollow holes 81 that avoid the water outlet nozzle 5, without affecting a connection between the top of the water outlet nozzle 5 and the insertion holes 61 on the sliding plate 6. On two opposite sides of the track bracket 8, there are a plurality of track plates 82 provided in a same horizontal direction. The sliding plate 6 is correspondingly provided with track grooves 63 on two sides of the track bracket configured for the track plates 82 to be inserted. The sliding plate 6 slides along the track plates 82 through the track grooves 63, and is guided by the track plates 82 to ensure a stable translational movement of the sliding plate 6 within the water outlet chamber 3.

In an implementation mode, the transmission mechanism 71 adopts an impeller 74 to cooperate with the water flow to drive the cam 72. In an implementation mode, the transmission mechanism 71 includes a water inlet plate 73, the impeller 74, and a gear mechanism 75. The water inlet plate 73, the impeller 74, and the gear mechanism 75 are arranged in sequence along a direction of water entering. The water inlet plate 73 is provided with a plurality of inlet ports 731 that are diagonally penetrated and arranged in a circumferential direction. The water source entering the water inlet joint 21 flows through the inlet ports 731 to form a diagonally sprayed water column. The water column continuously impacts blades of the impeller 74 and drives the impeller 74 to rotate. Bottoms of the blades are provided with a driving gear 741 that cooperates with the gear mechanism 75. The gear mechanism 75 is provided with a power output end and a power input end that meshes with the driving gear 741. The cam 72 is provided on the power output end, and the gear mechanism is used, so kinetic energy generated by a rotation of the impeller 74 is steadily transmitted to the cam 72 to render the cam 72 to rotate stably and ensure stable swinging of the showerhead for water discharge. The above-mentioned gear mechanism 75 includes a sleeve 751 with a toothed inner wall, and a first planetary gear set 752 and a second planetary gear set 753 provided in the sleeve 751 and meshing with an inner wall of the sleeve 751. The first planetary gear set 752 includes a first gear carrier 7521 and a first gear set 7522, and the second planetary gear set 753 includes a second gear carrier 7531 and a second gear set 7532. The first gear set 7522 forms a power input end that meshes with the driving gear 741, and a bottom of the first gear carrier 7521 is provided with a transmission gear 7523 that meshes with the second gear set 7532. The power output end is provided at a bottom of the second gear carrier 7531. By using a layout of a dual planetary gear set, an obtained load is larger, high capability and smooth operation are compliance with the high load requirements of the cam 72, and due to the small torque requirement of the planetary gear mechanism 75 on the power input end, it can render the driving of the impeller 74 easier and thus prolong the working life of the impeller 74. Besides that, a compact arrangement structure of the planetary gear mechanism 75 does not occupy space, further reducing the space occupied by the hydrodynamic device 7 and keeping an overall volume of the showerhead small and compact. Furthermore, a central rotating shaft 732 extends downward from a middle of the water inlet plate 73, and the impeller 74, the first gear carrier 7521, and the second gear carrier 7531 are rotatably provided on the central rotating shaft 732 for stable rotation.

In an implementation mode, a bottom wall of the water outlet chamber 3 is provided with a sealing gasket 9, and the sealing gasket 9 is provided with a plurality of sealing sleeves 91 corresponding to the water outlet nozzle 5. The water outlet nozzle 5 is provided in the sealing sleeve 91 in a sealing manner, thereby sealing tops of the water outlet holes 4 to prevent occasional water leakage caused by continuous water impact on the connection between the water outlet nozzle 5 and the water outlet holes 4, and to ensure that all water will flow out through the water outlet nozzle 5. In an implementation mode, the sealing sleeve 91 is provided with a folding part 92, and the folding part 92 is provided with a sleeve opening 93 configured for a top of the water outlet nozzle 5 to pass through. The folding part 92 can form sufficient movement margin to cooperate with a swinging action of the water outlet nozzle 5, thereby achieving sealing without hindering the movement of the water outlet nozzle 5.

In an implementation mode, the joint 51 on the water outlet nozzle 5 is formed by a spherical protrusion in a middle of the water outlet nozzle 5, and inner walls of the outlet holes 4 are provided with a bowl-shaped groove 41 that matches with the spherical protrusion. A spherical surface matching allows the joint 51 of the water outlet nozzle 5 to rotate more smoothly, thereby enabling the water outlet nozzle 5 to swing smoothly.

The above-mentioned showerhead is mainly applied for side spraying and will be provided vertically with two or more, so as to provide comprehensive massage spraying to the human body through the swinging water outlet, bringing the user a new shower experience. The above-mentioned showerheads can be provided on the bathroom wall in both concealed and exposed forms.

Figure 12:
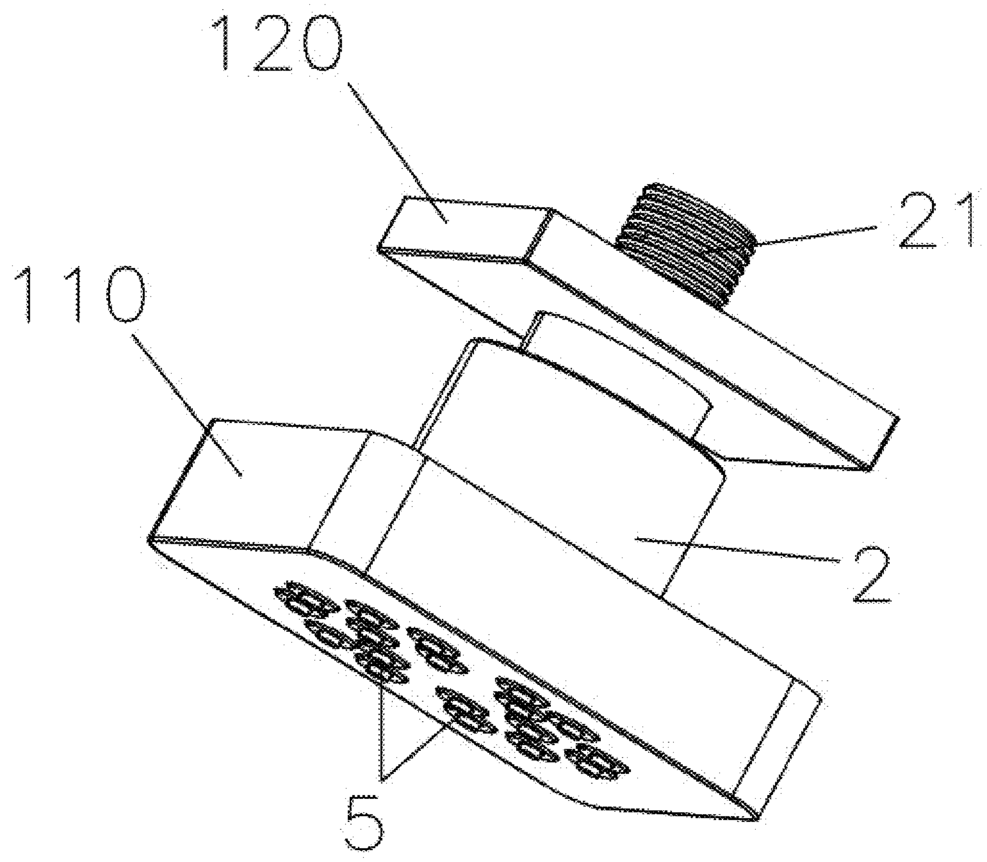
FIG. 12 is a schematic structural diagram of the present disclosure in an open installation form.
Figure 13:
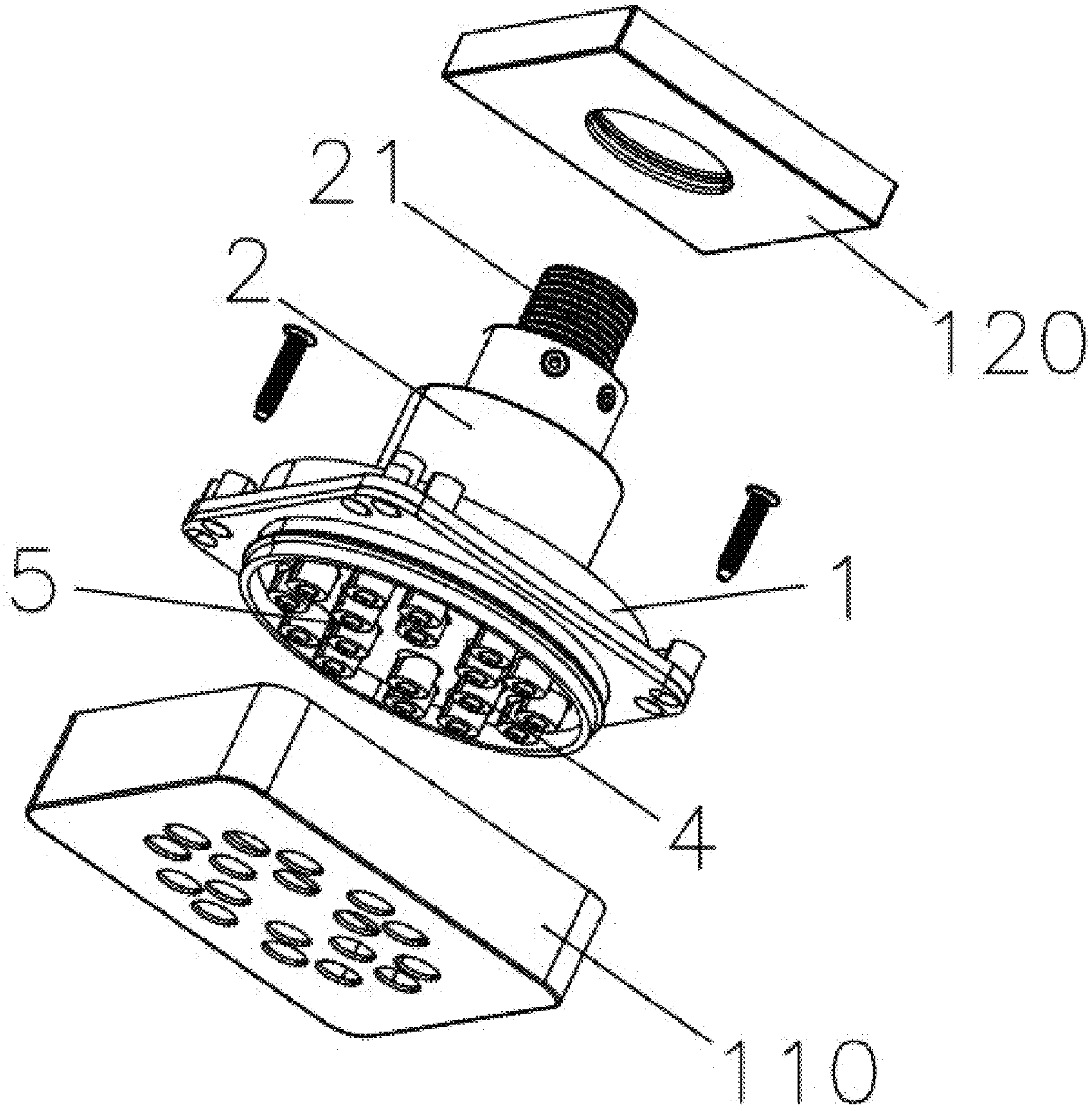
FIG. 13 is a schematic diagram of a split of FIG. 12.

As shown in FIGS. 12 and 13, when an open installation form is used, only a water pipe joint needs to be retained on a wall for a water inlet faucet of the showerhead to connect, and the showerhead water outlet tray 1 is accommodated in a decorative box 110. In addition to beautifying the appearance, the decorative box 110 can also protect the showerhead water outlet tray 1. The water inlet seat 2 is provided with a decorative plate 120, and the water inlet joint 21 is located behind the decorative plate 120. After the water inlet joint 21 is connected to the water pipe joint of the wall, the connection position is covered and blocked by the decorative plate 120.

Figure 10:
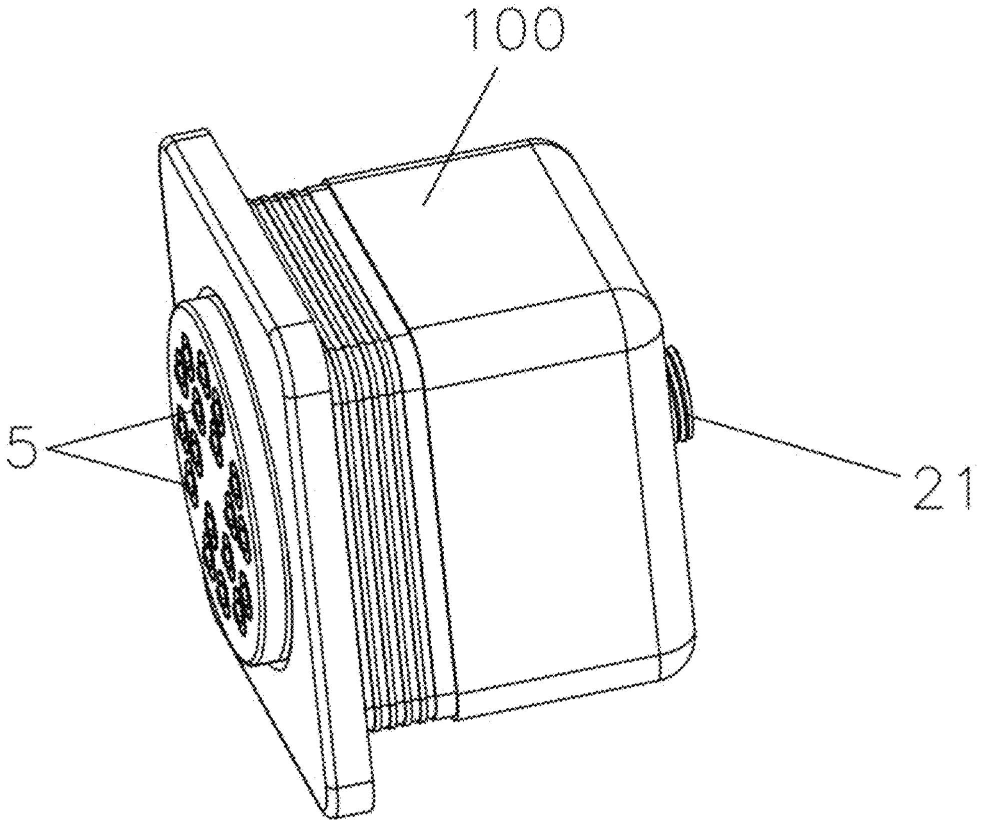
FIG. 10 is a schematic structural diagram of the present disclosure in a concealed form.
Figure 11:
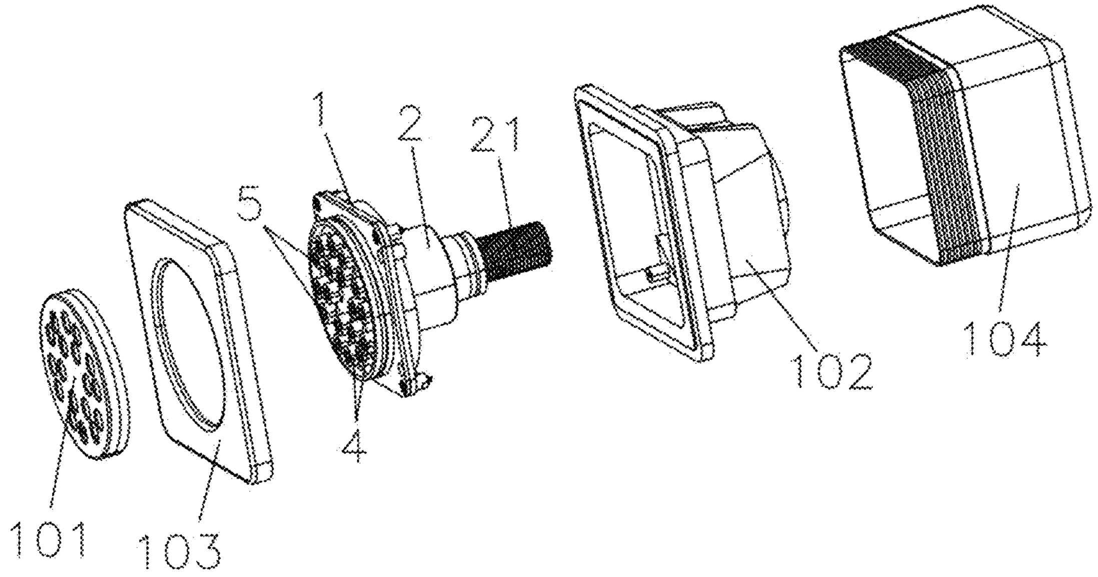
FIG. 11 is a schematic diagram of a split of FIG. 10.

As shown in FIGS. 10 and 11, when a concealed installation way is used, a buried wall groove needs to be reserved on the wall, and the showerhead water outlet tray 1 and water inlet seat 2 are provided in a pre-embedded shell 100 and installed together in the buried wall groove. The pre-embedded shell 100 includes a face cover 101, a bottom shell 102, a decorative frame 103, and a pre-embedded box 104. The face cover 101, the bottom shell 102, and the decorative frame 103 form an accommodation cavity configured to accommodate the showerhead water outlet tray 1 and the water inlet seat 2, this accommodation cavity can provide sufficient protection. The pre-embedded box 104 is sleeved outside the bottom shell 102 for secondary protection, and a surface of the pre-embedded box 104 is provided with a plurality of corrugated grooves and embedded in the wall, so that the corrugated grooves abut against an inner wall of the embedded wall groove, rendering the pre-embedded shell 100 more stable to install. The water inlet joint 21 passes through the bottom shell 102 and the pre-embedded box 104, and is communicated with the water pipe in the wall.

What is claimed is:

1. A showerhead with massage function, comprising a showerhead water outlet tray and a water inlet seat, wherein a water outlet chamber is provided in the showerhead water outlet tray, and a plurality of water outlet holes communicated with the water outlet chamber are provided on a bottom surface of the water outlet chamber;

the water inlet seat is provided on a top surface of the showerhead water outlet tray and communicated with the water outlet chamber;

a top of the water inlet seat is provided with a water inlet joint that is connected to an external water source;

wherein each of the water outlet holes is provided with a water outlet nozzle, and a middle of each of the water outlet nozzles is provided with a joint;

each joint is cooperated with an inner wall of one corresponding water outlet hole of the water outlet holes to render one corresponding water outlet nozzle to swing around one corresponding joint as a center and swing in the one corresponding water outlet hole of the water outlet holes;

the water outlet chamber is provided with a sliding plate that is capable of moving horizontally;

a plurality of insertion holes configured for a top of each of the water outlet nozzles to be inserted is provided on the sliding plate, when the sliding plate is moved horizontally, the water outlet nozzles are driven to swing synchronously;

a hydrodynamic device is provided in the water inlet seat, and the hydrodynamic device is driven by the water source entering through the water inlet joint;

the hydrodynamic device comprises a transmission mechanism driven by the water source and a cam driven by the transmission mechanism;

a middle of the sliding plate is provided with a driven groove that cooperates with the cam;

an outer contour surface of the cam abuts against a side wall of the driven groove; by rotating the cam, the outer contour of the cam sequentially pushes two opposite side walls of the driven groove to achieve a translational movement of the sliding plate;

wherein the water outlet chamber is further provided with a track bracket, and the track bracket is provided with a plurality of hollow holes, a plurality of track plates are provided in a same horizontal direction on two sides of the track bracket;

two sides of the sliding plate are provided with track grooves, and each of the track plates is inserted into one corresponding track groove of the track grooves; and the sliding plate slides along the track plates through the track grooves to achieve the translational movement in the water outlet chamber.

2. The showerhead according to claim 1, wherein the transmission mechanism comprises a water inlet plate, an impeller, and a gear mechanism, wherein the water inlet plate, the impeller, and the gear mechanism are arranged sequentially;

wherein the water inlet plate is provided with a plurality of inlet ports that are diagonally penetrated and arranged in a circumferential direction;

when the water source entering the water inlet joint flows through the inlet ports, the water source forms a water column that sprays diagonally and impacts blades of the impeller, thereby driving the impeller to rotate;

a bottom of the impeller is provided with a driving gear that cooperates with the gear mechanism;

the gear mechanism is provided with a power output end and a power input end that meshes with the driving gear; and the cam is provided on the power output end.

3. The showerhead according to claim 2, wherein the gear mechanism comprises a sleeve with a toothed inner wall, and a first planetary gear set and a second planetary gear set provided in the sleeve and meshing with the toothed inner wall of the sleeve, the first planetary gear set comprises a first gear carrier and a first gear set, the second planetary gear set comprises a second gear carrier and a second gear set, the first gear set forms the power input end meshing with the driving gear;

a bottom of the first gear carrier is provided with a transmission gear that meshes with the second gear set, and the power output end is provided at a bottom of the second gear carrier.

4. The showerhead according to claim 3, wherein a central rotating shaft extends downward from a middle of the water inlet plate, the impeller, the first gear carrier, and the second gear carrier are rotatably provided on the central rotating shaft.

5. The showerhead according to claim 1, wherein a sealing gasket is provided on a bottom wall of the water outlet chamber, and the sealing gasket is provided with a plurality of sealing sleeves corresponding to the water outlet nozzles;

the water outlet nozzles are provided in the sealing sleeves in a sealing manner.

6. The showerhead according to claim 5, wherein each of the sealing sleeves is provided with a folding part, and each folding part is provided with a sleeve opening configured for a top of one corresponding water outlet nozzle to pass through.

7. The showerhead according to claim 1, wherein a spherical protrusion is formed in a middle of each of the water outlet nozzles to form the corresponding joint, and a bowl-shaped groove is formed on the inner wall of each of the water outlet holes to match with the spherical protrusion.

8. The showerhead according to claim 1, wherein the showerhead water outlet tray and the water inlet seat are provided inside a pre-embedded shell, the pre-embedded shell comprises a face cover, a bottom shell, a decorative frame, and a pre-embedded box;

the face cover, the bottom shell, and the decorative frame form an accommodation cavity configured to accommodate the showerhead water outlet tray and the water inlet seat, the pre-embedded box is sleeved outside the bottom shell and embedded in a wall, and the water inlet joint passes through the bottom shell and the pre-embedded box, and is communicated with a water pipe in the wall.

9. The showerhead according to claim 1, wherein the showerhead water outlet tray is accommodated in a decorative box, a decorative plate is provided on the water inlet seat, and the water inlet joint is located behind the decorative plate.

* * * * *